L. G. KNIFFEN.
Mower.
No. 42,296. Patented April 12, 1864.
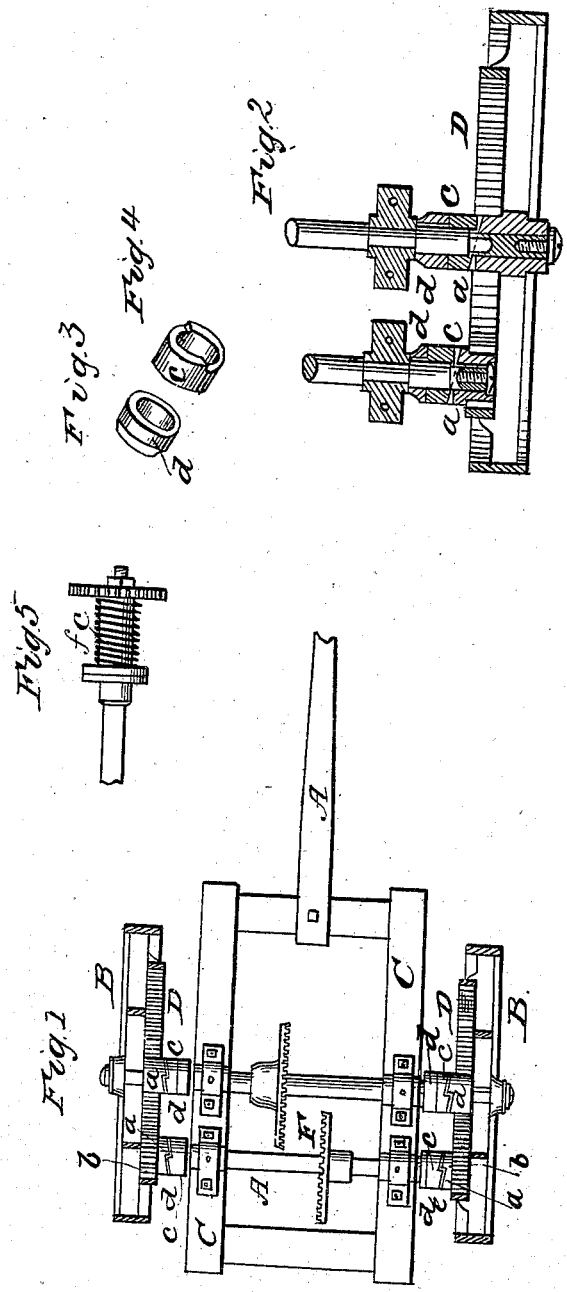

UNITED STATES PATENT OFFICE.

L. G. KNIFFEN, OF WORCESTER, MASSACHUSETTS.

IMPROVEMENT IN HARVESTERS.

Specification forming part of Letters Patent No. 42,296, dated April 12, 1864.

*To all whom it may concern:*

Be it known that I. L. G. KNIFFEN, of Worcester, in the county of Worcester and State of Massachusetts, have invented a certain new and useful Improvement in Harvesters; and I do hereby declare that the following is a full, clear, and exact description thereof, reference being had to the accompanying drawings, forming a part of this specification, and in which—

Figure 1 represents a plan view of so much of a harvester as is necessary to illustrate my invention, the main wheels being shown in section. Fig. 2 represents a horizontal section of a part of Fig. 1. Figs. 3 and 4 represent parts in perspective, and Fig. 5 represents a modification, or rather the application, of a spring to the parts shown in the other figures.

In Figs. 2 and 3 the invention is shown applied to two classes of these machines. One class is that known as the "Ball mower" and "Union mower," in which the main wheels act independent of each other and communicate their motion to small pinion-wheels on the ends of a shaft parallel to the axes of the main wheels, and which pinion-wheels are so connected with their shaft by means of pawls and ratchets that when the machine moves forward the main bevel-gear on said shaft will be operated, but not when the machine is backed. There are many objections to pawls and ratchets, and these objections are obviated by my invention.

Referring to the drawings, A represents the secondary shaft used in the Ball and Union machines; but instead of pawls and ratchets, a wedge-hub, $a$, is cast or otherwise fastened to the inside of each of the small pinion-wheels $b$, and a corresponding wedge-piece, $c$, is placed between the shoulders $d$, fast on the ends of said shaft and the hubs $a$. The hubs $a$ and pieces $c$ have abrupt shoulders $e$, which fit against and lap past each other, as fully indicated in the drawings. There is also room for a little play laterally for the pieces $c$ between the hubs $a$ and shoulders $d$.

The operation in this case will be readily understood. For instance, suppose the machine was to be drawn forward by the tongue A, the main wheel B, which supports the frame C, would cause, by means of their gears D D, the small pinion-wheels $b\ b$ to turn over forward, whereby the wedge sides of their hubs $a\ a$ would be forced against the wedge sides of the pieces $c\ c$, thereby causing so much friction between the pieces $c\ c$ and the shoulders $d\ d$, fast on the shaft E, as to cause the latter to revolve, together with its bevel-gear F, from which motion is to be communicated to the cutter-bar in any well-known manner. When the machine is backed the pieces $c\ c$ are left loose or unwedged and turn with the hubs $a\ a$, while shaft E, with its gear F, remains stationary.

It will be observed that with the above arrangement all the advantages of independent action of the wheels are obtained, and that, too, without the use of pawls and ratchets, since one side or wheel can operate the cutters independent of the other.

The drawings also show the application of the same invention to machines geared like the "Buckeye." In this class of machines the main bevel-gear is fast on the shaft of the main wheels and the parallel shaft dispensed with. The application to this class of machines will be readily understood from the drawings. The hubs $a\ a$ are cast or fastened upon the main wheels, while shoulders $d\ d$ are fastened to the main axle or shaft, and between which are arranged the wedging-pieces $c\ c$. In this case the main bevel-gear, which operates the cutters through proper mechanism, is placed upon the main axle, as indicated in the drawings, the secondary shaft not being used.

It may be found desirable to employ a spring to force the pieces $c\ c$ away from the hubs $a\ a$ in order to cause the wedging to take effect more readily, and in which case a collar, $f$, could be cast or formed on the pieces $c\ c$, as indicated in Fig. 5, and a spiral spring, $g$, employed, as indicated in the same figure.

Having described my improvement, what I claim as my invention, and desire to secure by Letters Patent, is—

The combination and arrangement, with the main driving-wheels of a harvester and the cutting apparatus thereof, of the parts marked $a$, $c$, and $d$, whereby when the machine is turned either to the right or left the cutting apparatus will be operated without cramping either wheel, and whereby the machine can be backed without noise or operating the cutters, substantially as described.

L. G. KNIFFEN.

Witnesses:
L. M. NORTON,
L. C. STEBBINS.